April 22, 1969  D. M. PETERSON ET AL  3,439,596
RETRACTILE LENS CAMERA WITH AUTOMATIC EXPOSURE CONTROL
SYSTEM AND BATTERY PRESERVING SWITCH
Filed Jan. 18, 1967

DEAN M. PETERSON
WILLIAM WINDLE, JR.
CHARLES E. PICKERING
INVENTORS

BY Robert W Hampton
Ronald S. Cavelon

ATTORNEYS

United States Patent Office 3,439,596
Patented Apr. 22, 1969

3,439,596
RETRACTILE LENS CAMERA WITH AUTOMATIC EXPOSURE CONTROL SYSTEM AND BATTERY PRESERVING SWITCH
Dean M. Peterson, William Windle, Jr., and Charles E. Pickering, Rochester, N.Y., assignors to Eastman Kodak Company, Rochester, N.Y., a corporation of New Jersey
Filed Jan. 18, 1967, Ser. No. 610,088
Int. Cl. G03b 19/04
U.S. Cl. 95—11                 5 Claims

ABSTRACT OF THE DISCLOSURE

In a camera having a retractile objective lens and an automatic exposure control system of the type employing a battery, a switch is associated with the retractile lens assembly to open the battery circuit when the lens is retracted and to close the circuit when the lens is extended to its operative position, thereby preventing drainage of the battery while the camera is not in use.

---

In a camera employing an automatic exposure control system operated by electrical energy from a dischargeable electrical energy source such as a battery, it is apparent that means should be provided to prevent the battery from being discharged by the exposure control system while the camera is not being used. To accomplish this objective, it is known to incorporate a normally open switch in the electrical circuit of the exposure control system and to close the switch by means of the shutter operating trigger so that the circuit is energized only while the trigger is be inoperated. While such an arrangement minimizes the time during which the battery is discharged through the circuit, this arrangement also tends to impair the accuracy of the exposure control system due to the extremely short time interval between the energization of the system in response to the initial movement of the trigger and the subsequent shutter operation. Therefore, the resulting diaphragm opening and/or shutter speed adjustment may reflect a position of the movable element of the exposure control system before it assumes a stable position accurately related to scene illumination.

For practical purposes, the amount of current drawn by the energized exposure control system is small, to the extent that with the above-described switching arrangement the so-called shelf life of the battery is a greater factor in determining its life expectancy than is the number of times the system is energized. Therefore, it is not essential to reduce to such almost momentary intervals the time during which the battery is supplying power to the exposure control device. It is important, however, to insure that the small current consumption of the system does not continue to discharge the battery over extended periods during which the camera is not in use. Accordingly, the present invention contemplates energizing the exposure control system in response to the movement of the camera lens to an extended position required prior to operation of the camera, and opening the battery circuit while the lens is retracted to facilitate carrying or storing the camera.

Various specific means for carrying out the invention will be apparent from the following detailed description, reference being made to the accompanying drawings in which like reference numerals refer to like elements and in which.

Figure 1:
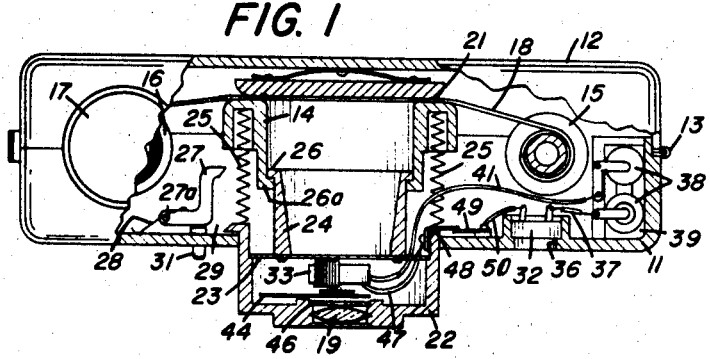
FIG. 1 is a top plan view of a camera according to the invention with portions thereof broken away and cross sectioned to illustrate internal details.

Referring first to FIG. 1, the camera illustrated comprises a front casing member 11 and a rear casing member 12 attached by a hinge 13. A tubular, generally rectangular internal support member 14 is mounted to the front casing member 11 within the camera between a film supply spool 15 and a film take-up spool 16 attached to winding knob 17. Member 14 defines a flat film support surface against which a portion of filmstrip 18 is held in normal relation to the axis of an objective lens 19 by a pressure plate 21 attached to the rear casing member 12. The objective lens 19 is supported by a boxlike lens housing member 22 extending through an opening in the front wall of casing member 11. Member 22 includes an internal mechanism plate 23, to which is attached a tubular guide member 24 telescopically received within support member 14 to allow sliding movement of the lens housing assembly along the axis of the lens 19.

A plurality of compression springs, as shown at 25, are located between the lens housing 22 and support member 14 to urge the housing toward its illustrated extended position in which the lens 19 is positioned at an operative focal distance from the film by the engagement of outwardly projecting lip 26 on member 24 with an inwardly directed lip 26a about the front portion of support member 14.

To enable the bulkiness of the camera to be reduced so that it can be carried or stored conveniently in a pocket or other receptacle of similar size when not in actual use, the lens housing 22 is moved manually in a rearward direction, against the influence of springs 25, to a position in which its front surface is generally flush with the forward wall of casing member 11. When the lens housing assembly has been moved to its retracted position, a latch member 27, pivotally supported by pin 27a and biased in a clockwise direction by a spring 28, engages a pawl 29 on the housing to retain it in such position until the latch member 27 is released by means of pushbutton 31.

Figure 2:
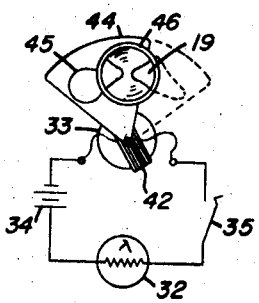
FIG. 2 is a schematic view of an exposure control system that may be employed in the camera shown in FIG. 1.

The automatic exposure control system of the camera, as illustrated schematically in FIG. 2, comprises a photoresistive element or photocell 32 connected in an electrical series circuit with an electromechanical transducer in the form of a galvanometer 33, an electrical power source 34, and a switch 35. As shown in FIG. 1, the photocell 32 is supported behind an opening 36 in the front wall of the camera, with one terminal thereof connected by lead wire 37 to one side of the power source 34 comprising a pair of batteries 38 supported in series relation within a battery compartment 39. The other side of the power source 34 is connected by a flexible lead wire 41 to the armature 42 of galvanometer 33 mounted on mechanism plate 23.

The armature 42 supports a vane 44 provided with a keyhole shaped aperture 45 aligned with lens 19 in a known manner behind an aperture disk 46 which permanently masks off lateral areas of the lens 19. The other galvanometer lead wire 47 is connected to a resilient conductive strip 48, coupled to the lens housing by insulating means and adapted to contact a similar strip 49, located on the interior of front casing member 11 and connected to the other terminal of the photocell 32 by wire 50. Thus, the two conductive strips 48 and 49 comprise the switch illustrated schematically at 35, which is closed to energize the circuit when the lens housing is extended and opened by movement of strip 48 out of contact with strip 49 when the housing is retracted.

While the illustrated exposure control system is of the so-called masked single-vane type and employs a photoresistive type of photocell, it should be understood that such a system is merely illustrative of the manner in which the subject switch structure could be incorporated in any of various types of exposure control systems employing a dischargeable power source.

Figure 3:
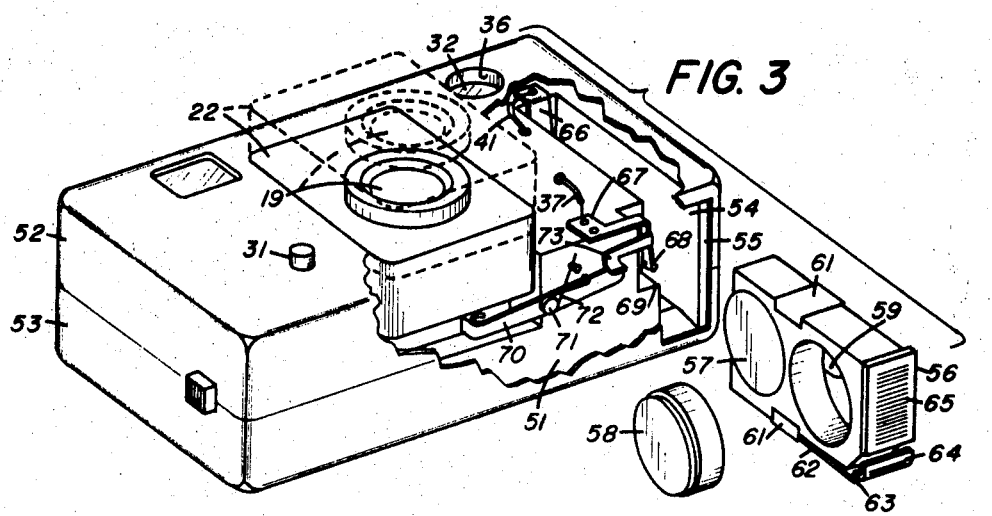
FIG. 3 is a perspective view of a camera generally similar to the one shown in FIG. 1 but employing a preferred type of battery switch associated with batteries supported in a removable housing, shown in exploded relation to the camera.
Figure 4:
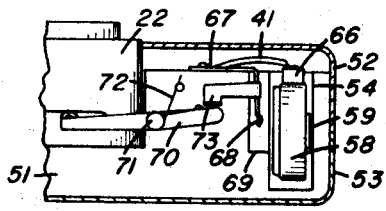
FIG. 4 is a partial cross sectional bottom plan view of a portion of the camera shown in FIG. 3, illustrating the manner in which the switch is held in open position by the retracted lens housing.
Figure 5:
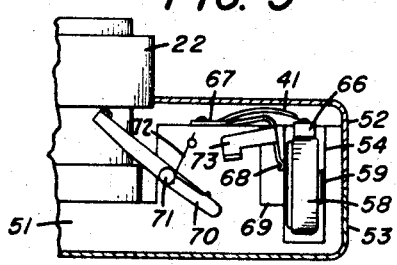
FIG. 5 is a view corresponding to FIG. 4 showing the switch in closed condition when the lens housing has been extended.

The camera depicted in FIGS. 3, 4 and 5 is generally similar to the one shown in FIGS. 1 and 2 and may be presumed to employ the same general type of automatic exposure control means, similar elements of the two cameras being identified by the same reference numerals. In this camera the internal body member 51 includes a structure corresponding to member 14, but substantially fills the camera housing defined by front and rear casing members 52 and 53, whereby the internal components of the camera are supported primarily by the body member rather than by the casing members. At a position corresponding to the location of the battery compartment of the previously described camera, body member 51 is provided with an elongate slot 54, aligned with a somewhat larger opening 55 in the casing members and adapted to receive a removable battery clip 56.

The battery clip is formed of an insulating plastic material and is adapted to accommodate two button type batteries 57 and 58 in corresponding holes defining shoulders to permit only correct attachment of the batteries. The batteries are installed in the clip in opposite directions with the positive end of battery 57 being electrically connected in series relation to the negative end of battery 58 by a contact strap 59 attached to the clip by ear member 61. The contact strap member also defines a resilient latch arm 62 extending along the lower edge of the clip, as viewed in FIG. 3, which includes a latching shoulder 63 and an externally accessible end portion 64 adjacent the external flange 65 of the clip. By this arrangement, when the battery clip is loaded and installed in the camera, shoulder 64 engages the rearward edge of casing member 53 adjacent opening 55 to retain the clip in its installed position, from which it may be withdrawn by moving the accessible end portion 64 of the arm toward the flange portion 65 of the clip, thereby springing the latching arm to disengage the shoulder 63 from the casing.

When the clip is in installed position in the camera, the negative edge surface of battery 57 is in engagement with a contact strap 66 supported on the internal body member and connected to flexible wire 41 leading to the galvanometer, which, in this embodiment, also is connected directly to the photocell by a second flexible wire, not shown, rather than through the previously described switch structure. If the body member is itself conductive, it is of course obvious that the contact strap and other electrical components would be insulated therefrom. Wire 37, leading from the other photocell terminal, is connected to switch member 67, which is supported on the body member and includes a resilient contact arm 68 extending into a recess 69 adjacent battery 58, as best seen in FIGS. 4 and 5.

When the lens housing 22 is extended, as shown in FIG. 5, and in broken lines in FIG. 3, the resilient contact arm 68 engages the positive end surface of battery 58 to close the exposure control circuit. To open the circuit when the lens housing is retracted, a coupling lever 70, pivotally attached to the body member by pin 71 and maintained in contact with the rearward edge of the lens housing by a light spring 72, is adapted to engage an extension leg 73 on contact arm 68, to spring the arm out of engagement with battery 58 as shown in FIG. 4. Thus, the function of this switch, comprising contact arm 68 and the adjacent battery surface, is the same as that of the previously described switch comprising straps 48 and 49 located between the photocell and the galvanometer. However, by this construction, the resilient contact arm can be relatively stiff to insure good contact with the battery without exerting a corresponding force on the lens housing that would tend to distort its parallel relation to the film plane when the housing is extended. Also, in the preferred construction, the end of contact arm 68 contacts the adjacent battery surface with a slight wiping motion, thereby tending to maintain the two contacting surfaces free of foreign matter or corrosion. If, nevertheless, it should be necessary to clean or polish the switch contact surfaces, this can be accomplished readily without requiring disassembly of the camera, by virtue of the accessibility of contact arm 68 to opening 55 and the utilization of an end of one of the removable batteries as the other contact surface.

It also should be apparent that the battery or similar power source associated with the subject switching arrangement not only need serve an automatic exposure control device, but also could comprise the power source for other electrically operated elements of the camera, e.g., a flash illumination device or a film drive motor, from which the power source could also be isolated by the switch when the lens housing is retracted. Similarly, although this arrangement is particularly useful in conjunction with an exposure control system of the type described, it could be employed beneficially in a camera which does not include such a system but which uses a battery for flash illumination or other purposes, in order to insure against loss of current through imperfections in the related circuit when the camera is not being used.

The invention has been described in detail with particular reference to preferred embodiments thereof, but it will be understood that variations and modifications can be effected within the spirit and scope of the invention.

We claim:
1. In a camera including:
   (a) a casing;
   (b) a lens housing assembly movable relative to said casing between
       (1) an extended operative position, and
       (2) a retracted storage position;
   (c) means for receiving electric power supply means;
   (d) an electrically operated component; and
   (e) circuit means for connecting said component electrically to said power supply means; the improvement comprising:
   (f) switch means incorporated in said circuit means, said switch means having a first condition wherein said component is connected electrically to said power supply means in said receiving means, and a second condition wherein said component is disconnected electrically from said power supply means; and
   (g) means coupling said switch means with said lens housing assembly for placing said switch means in said first condition in response to movement of said lens housing assembly to said extended operative position, and in said second condition in response to movement of said lens housing assembly to said retracted storage position.

2. The invention defined by claim 1 wherein said power supply means comprises a battery removably supported within said casing, and said switch means includes a movable member in contacting engagement with said battery when the switch means is in said first condition, and spaced from said battery when the switch means is in said second condition.

3. The invention defined by claim 1 wherein said switch means includes a movable switch member; and further comprising resilient means biasing said switch member toward a position for placing said switch means in said first condition; and the coupling means comprises a switch operating element movable by said lens housing assembly to engage and move said switch member out of said position against the influence of said resilient means in response to movement of said assembly to said retracted storage position, and to disengage said member in response to movement of said assembly to said extended operative position.

4. The invention defined by claim 1 in which said casing defines an opening, said power supply means comprises a battery supported within said casing and removable through the opening in the casing, and said switch means includes a member movably supported within said casing at a location accessible from the exterior of said casing through said opening.

5. The invention defined by claim 1 and further comprising resilient means for urging said movable lens assembly to said extended position, and latch means for releasably retaining said movable lens assembly in said retracted position against the influence of said resilient means.

References Cited

UNITED STATES PATENTS

| | | | |
|---|---|---|---|
| 3,051,066 | 8/1962 | Lareau et al. | 95—11 |
| 3,127,824 | 4/1964 | Williams | 95—11 X |
| 3,194,137 | 7/1965 | Land et al. | 95—11 |

NORTON ANSHER, *Primary Examiner.*

C. E. SMITH, *Assistant Examiner.*

U.S. Cl. X.R.

95—10, 31